Sept. 8, 1931. W. H. WATT 1,822,256
PROCESS AND APPARATUS FOR MOLDING TUBES
Filed May 4, 1929 3 Sheets-Sheet 1
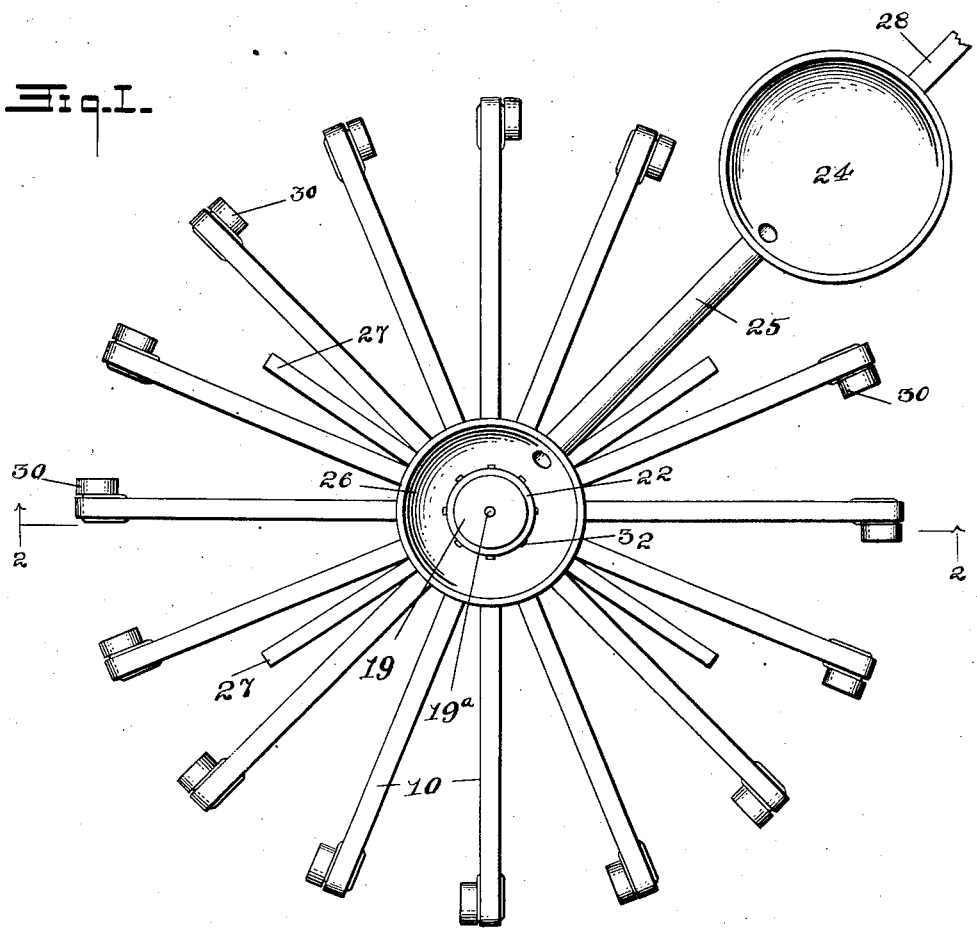
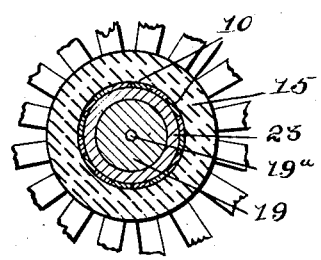
WITNESSES
INVENTOR.
William H. Watt
BY
ATTORNEY.

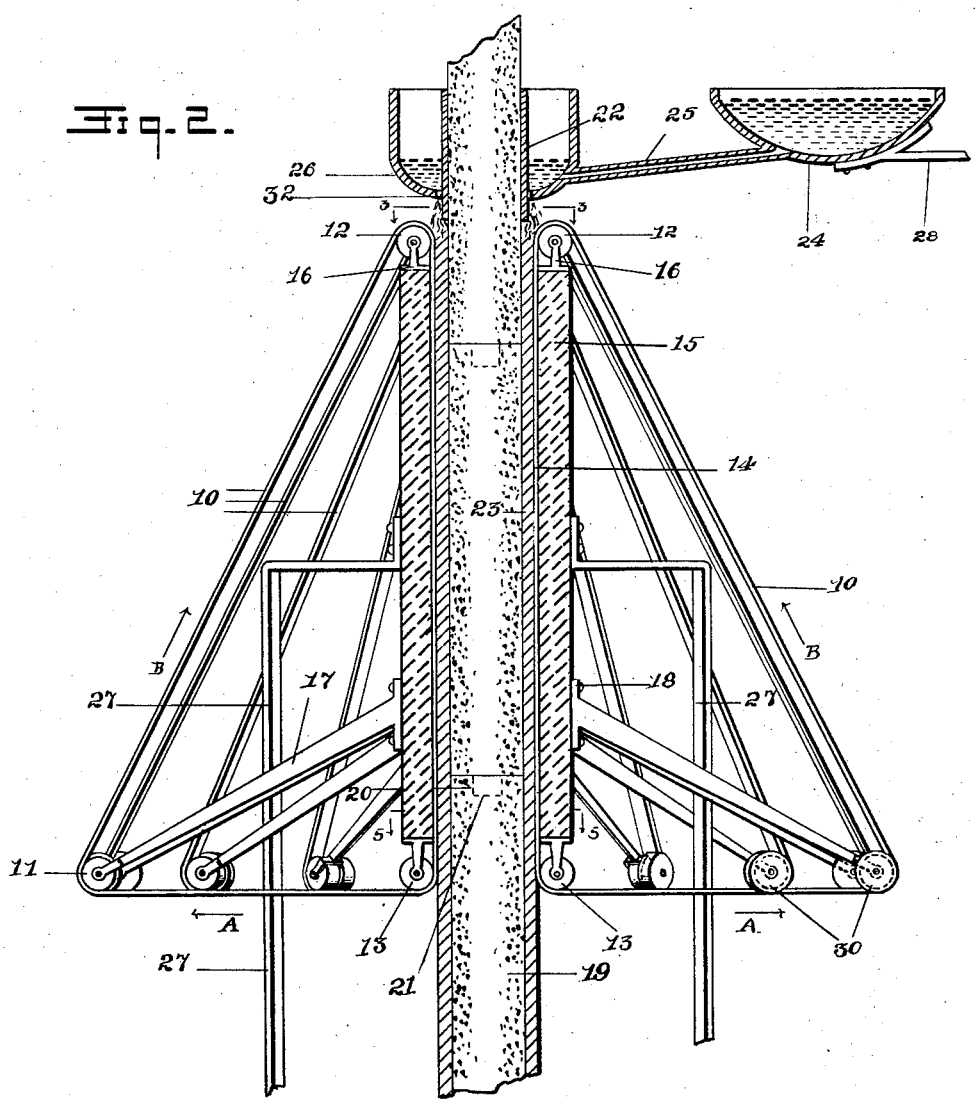

Sept. 8, 1931.  W. H. WATT  1,822,256
PROCESS AND APPARATUS FOR MOLDING TUBES
Filed May 4, 1929   3 Sheets—Sheet 3
Fig-3-
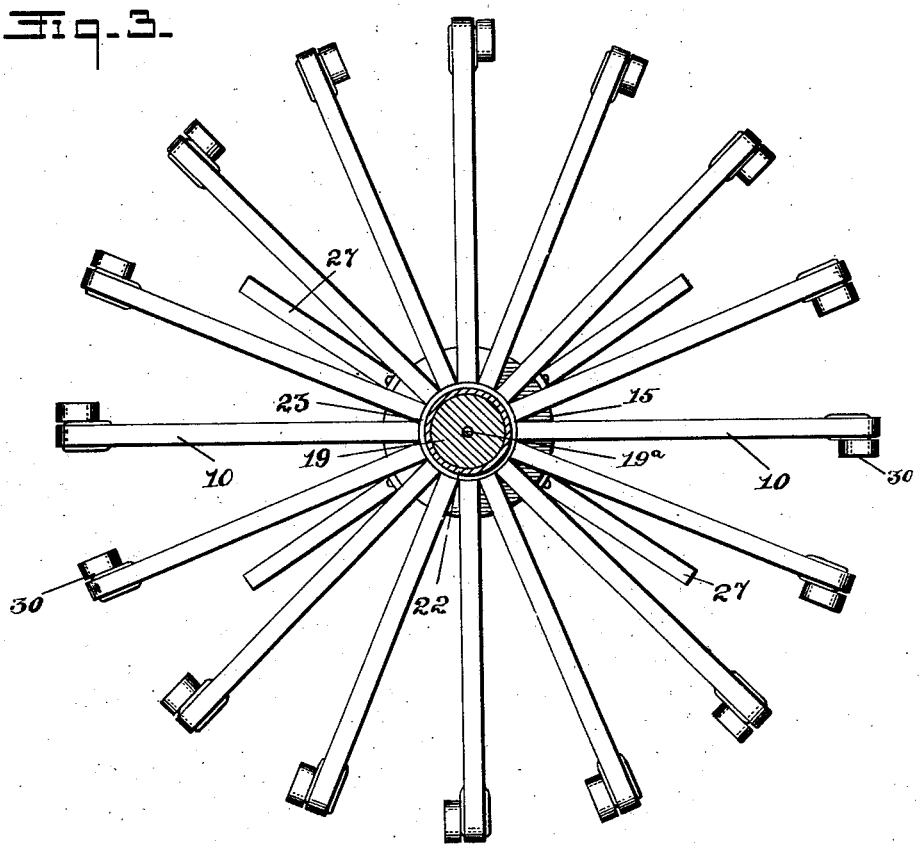
Fig-4-
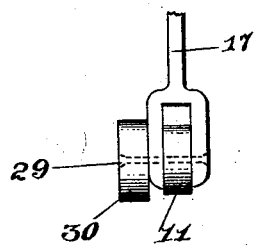
INVENTOR.
William H. Watt
BY
ATTORNEY.

Patented Sept. 8, 1931

1,822,256

UNITED STATES PATENT OFFICE

WILLIAM H. WATT, OF HADDON HEIGHTS, NEW JERSEY

PROCESS AND APPARATUS FOR MOLDING TUBES

Application filed May 4, 1929. Serial No. 360,349.

This invention relates to the molding of pipes and similar objects and has for an object to improve the method of molding articles of this character and a further object of providing novel and improved apparatus for this purpose.

Further objects are to devise a novel and improved method of continuously molding pipe or the like and to provide apparatus to this end.

These objects are accomplished by continuously forming a mould and a co-axial core therewith and continuously supplying molten metal between the core and mould and by the provision of apparatus to this end.

The apparatus may consist of a plurality of metallic wires or bands trained about pulleys arranged to cause the bands to converge into contacting relation to form themselves into a tube, then to travel for a distance in this relation.

This tubular construction is arranged about a vertical axis and means is provided to center a core co-axial thereto, this means taking the form of a guide tube. A tubular member of refractory material is provided through which the metallic bands move contacting therewith and constituting a moving lining therefor.

Suitable means is also provided to supply molten metal to the upper end of the tubular travel of the bands and between the same and the core which means is in the nature of a pouring basin having a ring of apertures aligned with the space between the mould and core. The core is of any suitable character, as refractory particles, for example, sand, held together by a volatile binder.

In the accompanying drawings is illustrated an arrangement of apparatus by which the above outlined process may be carried out. In these drawings, Figure 1 is a plan view showing the arrangement of apparatus, Figure 2 is a vertical section therethrough on the line 2—2 of Figure 1, Figure 3 is a section on the line 3—3 of Figure 2, Figure 4 is a detail view showing a form of driving connection for the movable bands, and Figure 5 is a section on the line 5—5 of Figure 2 and showing the relation of the movable bands within the refractory casing, the same also being shown in relation to the movable core and to the tube being moulded therebetween.

This apparatus consists in detail of a plurality of endless bands or wires 10 trained about pulleys 11, 12 and 13 suitably arranged to form the bands into a tubular configuration and to move the same while in this configuration along a course. The pulleys 12 and 13 are positioned at opposite ends of this course and, as shown in Figures 2 and 5, so position the bands or wires that they will form a tube of considerable length during a portion of their travel.

The remainder of the travel of these bands is along a course outwardly and then upwardly, as designated by the arrows A and B. During this portion of the travel of the bands they may be cooled to a certain extent prior to their turning over the pulleys 12 and reforming themselves into the tubular member, as designated by the numeral 14.

This tubular member constitutes the lining of a stationary tubular member 15 which may be of refractory material against the inner periphery of which the bands rest and which serves to maintain the bands in their tubular formation throughout their travel between the pulleys 12 and 13.

The purpose of forming the tubular member 15 of refractory material is to preserve the heat of the molten metal and prevent its too sudden cooling. The molten metal is cooled sufficiently in passing downward to prevent its sticking to the bands 10 and in the course of its travel through the tube sufficient heat is extracted so that the tube will emerge from the bottom of the mould formed by the tubes 14 and 15 and the core in a solidified condition, although at a very high temperature according to the metal of which the tube 23 is being formed.

The upper pulleys 12 are supported on the upper end of the tube 15 by means of brackets 16 and the lower pulleys by arms 17 extending radially from a ring 18 surrounding the tube 15, as shown in Figures 2 and 3 of the drawings.

Associated with the traveling tube as formed by the bands in the manner as set forth above is a core 19 which is made of granular refractory material such as sand, held together by a suitable binder and this binder may be of a character which will decompose or volatilize under the influence of the heat of the molten metal as the same is moved downwardly with the tube in formation.

This core may be made up of sections fed from above and joined one to the other as the formation of the continuous tube progresses and to this end the core will be provided on opposite ends with projections 20 and depressions 21 adapted to interfit one within the other.

In order to properly center these cores within the tubes 14 and 15, a centering device in the nature of a tube 22 is provided above the tubes 14 and 15 and co-axial therewith. This tubular member is of a size to properly receive the cores snugly fitting therein and is of sufficient length to center the same in co-axial relation with the tubes 14 and 15.

In order to provide for the escape of gases formed by volatilizing the binder within the sand and from any other source, the sand cores may be of tubular formation providing a continuous opening therethrough. Such an opening is designated by the reference character 19ª in Figure 5 of the drawings.

The tube in formation is designated by the numeral 23 and the molten metal for forming this tube is supplied from a pouring basin 24 through a conduit 25 to a gate 26 and from thence through a ring of apertures 32 in the bottom of the gate surrounding the tubular member 22. This ring of apertures is so positioned as to align with the space between the tube 24 and the cores 19 co-axially arranged thereto.

The conduit 25 leads from a point near the bottom of the pouring basin 24 which is of considerably greater extent than the gate 26 and discharges at a point near the top of the gate 26. This arrangement prevents scum and other impurities on the top of the pouring basin from reaching the gate and also provides for a less careful pouring of the material into the feeding receptacle.

The apparatus here described is supported in any suitable manner, as by brackets 27 and 28 secured to any supporting structure, as to the floor or to the walls of a building in which the process is being carried out.

The bands 10 are revolved about the pulleys in any suitable manner, as through suitable driving pulleys 30 secured on the same shafts 29 as the pulleys 11.

The process may be continuous and the pipe will be formed in a continuous length so long as the molten metal is supplied to the basin 24 and the cores and tubular lining 14 are kept moving along their respective courses.

In operation the bands 10 are started moving around their pulleys and through the tube 15 and the cores are fed through the guide 22 by an operator, each core being secured to the preceding one in the manner as set forth above. Metal is supplied to the basin 24 as needed and the lengths of pipe cut off at the lower end as formed.

In starting the process the core is supported in the bottom of the mould by a packing of sand, the upper end of the core being supported by the tubular guide 22. After the process has been started and a certain amount of tubing has been formed the core is supported and held centered by the forming tube itself, the forming tube being cool enough toward the lower end of the tube 15 for this purpose.

After the tube is formed the sand core which has been deprived of its binder may be dislodged in the well known manner. The type of sand core used is that common in the art and needs no detailed description here other than as outlined above.

It will be understood that variations of the process as outlined above and of the apparatus for carrying out the process may be made within the scope of the invention hereinbefore set forth and hereinafter claimed.

I claim:—

1. Apparatus for casting tubing consisting of a movable lining, confining means embracing the lining, a core uniform throughout, movable co-axial with said lining, and means for supplying molten metal between said lining and core.

2. Apparatus for casting tubing consisting of a tube, a movable lining, a core of sand uniform throughout, movable co-axial with said lining, and means for supplying molten metal between said lining and core.

3. Apparatus for casting tubing consisting of a fixed tube, a movable sectional lining, a sand core uniform throughout, movable co-axial with said lining, and means for supplying molten metal between said lining and core.

4. Apparatus for casting tubing including a stationary tube comprising substantially arcuate segments, a movable lining within the tube, and a movable core co-axial with and spaced from said lining, and means for supplying molten material to said casing.

5. Apparatus for casting tubing consisting of a casing formed of a plurality of continuously moving segmental parts, and a core fed continuously, co-axially of the casing, and means for supplying molten metal to the space between the casing and the core.

6. Apparatus for casting tubing, including a plurality of movable units, and means for forming said units into a substantially cylindrical tube at one stage of their movement, and a core fed co-axially of said tube, said core being of infusible granular material bounded by a volatilizable binder, and means for supplying molten metal between the core and the tube.

7. Apparatus for casting tubing, including a tube, a plurality of endless bands revoluble so as to pass through the tube and to be positioned side by side therein to form a substantially cylindrical lining for the tube, a core uniform throughout fed through the tube in co-axial spaced relation thereto, and means for supplying molten metal to the tube, said core being of granular refractive material held together by a volatile binder.

8. The process of casting tubing consisting in continuously supplying molten metal to one end of a continuously moving mould, and continuously feeding uniform core sections in abutting engagement coaxially of and in consonance with the mould.

9. The process of casting tubing consisting in forming a continuously moving mould, feeding uniform abutting core sections coaxially within the mould to move therewith, and pouring molten metal about the core to form a continuously uniform cast within the mould.

In testimony whereof I have signed my name to this specification.

WILLIAM H. WATT.